Patented June 14, 1938

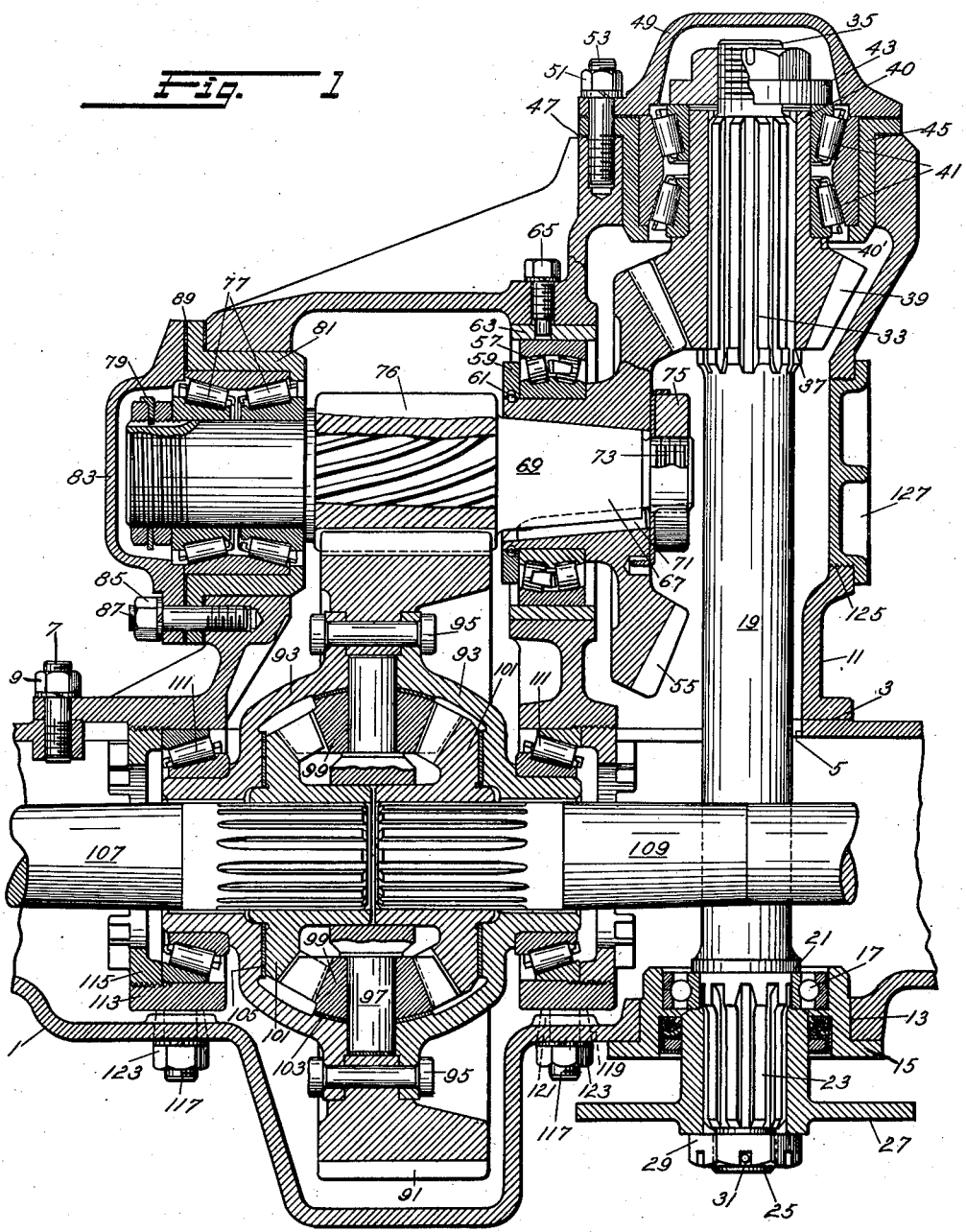

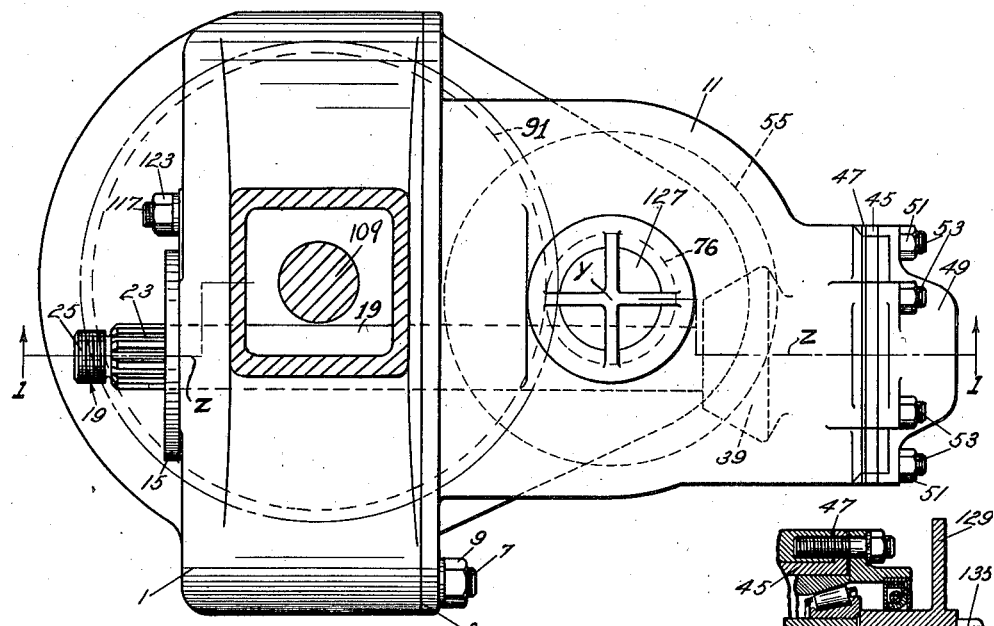
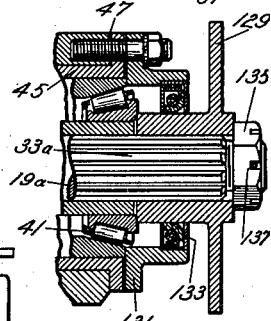
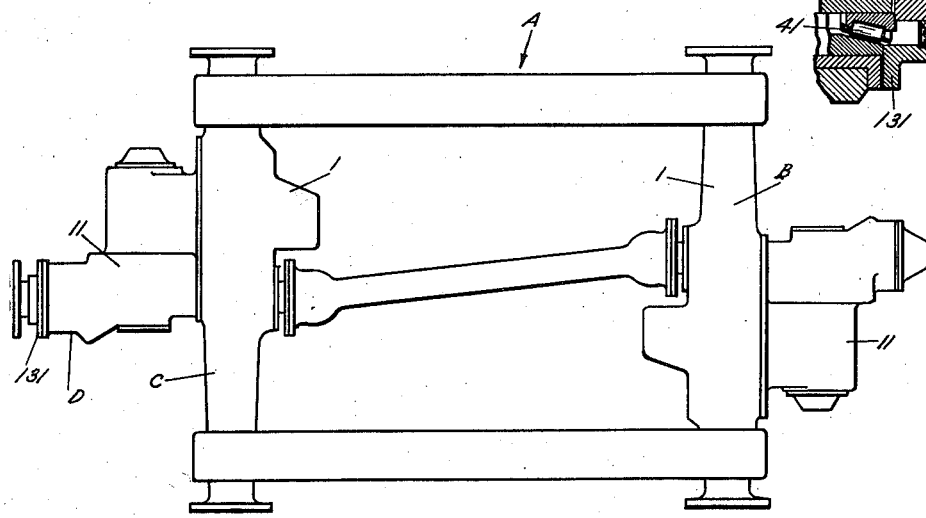

2,120,594

UNITED STATES PATENT OFFICE 2,120,594

AUTOMOTIVE DRIVING ASSEMBLY

Herbert W. Alden, Detroit, Mich., assignor to The Timken-Detroit Axle Company, Detroit, Mich., a corporation of Ohio Application August 12, 1935, Serial No. 35,861

7 Claims. (Cl. 180—22)

This invention relates broadly to driving axle mechanisms, and more particularly to those types of driving axles that are commonly known as "double reduction" driving axles.

There are two types of double reduction axles known to the prior art. The first and oldest type is what may be termed the "dog leg" or "top mounted" wherein the first reduction, usually in the form of a bevel gear set is located either directly above or above and forward of the second reduction or spur gear set. This type is illustrated in the L. S. Clarke Patent No. 746,027. The second and later type of double reduction axle is what may be termed the "front mounted" wherein both reductions or gear sets are located in the same horizontal plane, the first reduction being forward of the second. This type is illustrated in the Willard F. Rockwell Patent Nos. 1,571,801, 1,730,900 and 1,776,703.

Either or both types of double reduction axles have been and still are being used with a great deal of success. However, there are instances of applications of such types such as upon short wheel base vehicles and through drive tandem units where a burden is placed upon the universal joints as regards high angularity, due to short propeller shafts, and their performance is not satisfactory.

Further, there are instances of application, especially in heavy duty vehicles, such as buses where a low floor height (above the ground) is desirable, where performance of the older types of double reduction axles are unsatisfactory.

While the front mounted type of double reduction axle may adequately fulfill the requirements in a number of such instances, there are set-ups which require that the propeller shaft be below the horizontal plane of the longitudinal axis of the axle in order to permit of an even lower floor height and a horizontal propeller shaft.

There are also instances where it is necessary in order to obtain balance in a vehicle to offset the motor with respect to the vehicle centerline. When a conventional axle is used in such instances, either the propeller shaft is not parallel to the vehicle axis which requires that the universal joints have an undesirable constant angularity, or if the propeller shaft is parallel, it is required that the bowl of the axle be offset with the result that unequal length axle shafts must be used.

With a view to the provision of a double reduction axle that is more satisfactory than the prior art devices noted in special applications foregoing, it is a primary object of my invention to provide a driving axle of novel character wherein the universal joint coupling attached thereto is at a minimum distance from the longitudinal centerline of the axle, thereby permitting the use of a propeller shaft of maximum length whereby the angularity thereof with respect to the center line of the vehicle may be kept at a minimum.

A further primary object of my invention is to provide in a motor vehicle a novel driving axle wherein the propeller shaft is lower than the axle axis, thus permitting the use of buses and like heavy-duty vehicles with even lower floor heights than have been hitherto employed.

A further object is to provide a driving axle of novel design wherein the propeller shaft is offset laterally with respect to the midpoint of the axle, through an arrangement of novel character whereby the angularity at which the universal joints operate is at a minimum and the use of equal length and interchangeable axle shafts is possible.

A further object is to provide a driving axle of novel design wherein the propeller shaft may be offset laterally with respect to a point midway between the axle shafts of the axle and may be below the horizontal axis of the axle with its longitudinal axis parallel to a horizontal plane.

A further object of my invention is to provide a double reduction driving axle of novel construction including bevel gearing of the hypoid variety whereby the propeller shaft may be offset below the horizontal axis of the axle.

Still a further object of my invention is the provision of a double reduction driving axle of novel construction wherein the first reduction assembly is in the rear of the second reduction assembly, power being applied at the point of the axle adjacent the second assembly.

A further object of my invention is to provide a double reduction driving axle embodying a novel arrangement of mechanism wherein the axis of the bevel ring gear of the first reduction assembly is in a substantially horizontal plane passing through the axis of the large spur gear of the second reduction assembly and is to the rear thereof, and the bevel pinion gear of said first reduction assembly is below the same horizontal plane and substantially parallel thereto.

Still a further object of my invention is to provide in a tandem through drive assembly, a novel arrangement of double reduction driving axles wherein the propeller shaft connecting said axles is of a maximum length, thereby reducing to a minimum the maximum operating angle required of the universal joints intermediate the axles and the propeller shaft and improving the manner of performance thereof.

Further objects of my invention are to provide a novel double reduction driving axle which is economical to manufacture, rigid, efficient and durable in operation, and compact in arrangement, whereby it may be employed in special installations wherein prior type devices may not be satisfactorily used. The above and further objects will be apparent from a consideration of the following description and appended claims taken in connection with the accompanying drawings wherein:

Figure 1 is a horizontal section taken substantially on the line 1—1 of Figure 2 of an axle incorporating my invention in a preferred form.

Figure 2 is a side elevation of the axle of Figure 1.

Figure 3 is a schematic plan view of a through drive tandem unit incorporating the driving axle of Figures 1 and 2, and Figure 4 is a partial section of the front end of the forward driving axle of the tandem unit of Figure 3.

Referring now to the drawings wherein like reference characters refer to like parts wherever they occur and with particular reference to Figures 1 and 2, the numeral 1 indicates an axle load-carrying housing member having an enlarged, gear receiving portion. Said housing member is provided on one side thereof with a vertical facing 3 having a circular aperture 5 therein. Surrounding said aperture 5 is a series of threaded apertures adapted to receive studs 7. Clamped to the vertical facing 3 by means of nuts 9 threaded onto studs 7 is a circular flange of a differential carrier generally indicated by the numeral 11.

On the opposite side of housing member 1 from vertical facing 3 is an aperture 13 which receives a bearing and oil seal carrying member 15. Member 15 is clamped to a machined surface provided therefor on said housing by suitable means, such as bolts (not shown). A bearing 17 is carried in a circular bore at the inner end of member 15, the bearing piloting one end of an axle propeller shaft 19. Propeller shaft 19 is provided with a shoulder 21 in abutting relationship with bearing 17, and on the opposite side of said bearing with a portion of reduced diameter formed with longitudinal splines 23 thereon. At the extreme outermost end of propeller shaft 19 is a second portion 25 of reduced diameter which is threaded. A universal joint coupling member 27 is non-rotatably mounted on splines 23, said member having internal splines for engagement therewith, the end of the hub of said member abutting the other side of bearing 17. Member 27 is removably secured to shaft 19 by means of a nut 29 on threaded portion 25 and is locked in place by means of a cotter 31.

Propeller shaft 19 extends through aperture 5 of housing 1 into differential carrier 11. Shaft 19 is provided at its opposite end with longitudinal splines 33 and a threaded portion 35 adjacent thereto. Splines 33 terminate at their inner end at a shoulder 37. A bevel pinion gear 39 having internal splines for engagement with splines 33 is mounted thereon, one end thereof abutting shoulder 37 on said shaft. Gear 39 is provided at its opposite end with a cylindrical hub portion 40 which is piloted in a twin bearing 41. The inner race of the inner of said bearings abuts a shoulder 40' provided therefor at one end of the cylindrical hub portion of gear 39 and the inner race of the other of said bearings is in abutting relationship with a flange of a nut 43 which is threaded onto threaded portion 35 of shaft 19. The single outer race of twin bearing 41 is carried in a bearing cage 45 having an outer circular flange in register with a clamping surface provided therefor on differential carrier 11. Bevel gear adjusting shims 47 are selectively inserted between said circular flange and said clamping surface.

A closure member 49 having a flange designed to register with the circular flange of bearing cage 45 is clamped thereto by means of nuts 51 threaded onto studs 53, which studs are threadedly received in apertures provided therefor in differential carrier 11.

In meshing engagement with bevel pinion gear 39 is bevel ring gear 55. Ring gear 55 is provided with a hub portion having a cylindrical surface piloted in a radial bearing 57, said bearing being in abutting relation with a shoulder provided therefor on said hub portion and clamped against said shoulder by means of a washer 59. Washer 59 is positioned on the outer end of said hub portion by means of a locking ring 61 inserted in semi-circular mating grooves on said hub and in said washer. Bearing 57 is contained in an outer race 63, said race being positioned in a circular recess provided therefor in differential carrier 11 by means of set screws 65.

The bore of the hub of gear 55 is tapered to receive a tapered portion 67 of cross shaft 69. The tapered bore of gear 55 and also the tapered portion 67 are provided with mating keyways for the insertion of a key 71. Adjacent tapered portion 67 is a threaded portion 73 on which is threaded a nut and lock washer assembly 75 which is for the purpose of removably securing gear 55 to shaft 69.

Adjacent tapered portion 67 of shaft 69 and integral therewith is a straight pinion gear 76 which is preferably formed with spiral teeth as shown. The opposite end of shaft 69 is cylindrical in shape and is piloted in a twin bearing 77, the inner race of one of which abuts a shoulder provided therefor on shaft 69, the inner race of the other of said bearings abutting the inner end of a lock nut assembly 79. Lock nut assembly 79 is screw-threadedly inserted onto a threaded portion provided therefor on the extreme end of shaft 69.

The single outer race of twin bearing 77 is carried in a bearing cage 81 which is substantially identical with bearing cage 45, above described. A cover 83, substantially identical with cover 49, above described, closes the bearing, nut and shaft assembly and is removably secured to differential carrier 11 by means of nuts 85 in screw threaded engagement with studs 87 provided therefor in said carrier. Bevel gear adjusting shims 89 are selectively inserted between bearing cage 81 and differential carrier 11.

Meshing with pinion gear 76 on cross shaft 69 is a bull gear or ring gear 91. Ring gear 91 is preferably formed with an internal circular flange which is clamped between circular flanges of substantially identical differential casings 93 by suitable means such as rivets 95. Differential casings 93 enclose a differential spider 97, differential pinions 99, differential side gears 101, differential pinion thrust washers 103 and differential side gear thrust washers 105. The splined inner ends of axle shafts 107 and 109 are inserted into the internal splines of side gears 101, The axle shafts are preferably of equal length, but may be of unequal length depending upon the desired location of propeller shaft 19 with respect to the longitudinal axis of the vehicle.

The outer end of each differential case 93 is provided with a cylindrical hub which is piloted in a bearing 111, the inner race of said bearing abutting a shoulder provided therefor on said hub. The outer race of said bearing is carried in a circular bore formed by a semi-circular pedestal integral with differential carrier 11 and a semi-circular differential bearing cap 113. The outer race of bearing 111 abuts a differential bearing adjusting ring 115 which is threadedly inserted into the circular aperture formed by said semi-circular pedestal and cap 113. The differential bearing cap 113 is removably secured to the semi-circular pedestal of differential carrier 11 by means of a nut (not shown) threaded onto a stud 117 contained in differential carrier 11. Stud 117 extends through apertures 119 provided therefor in housing 1. Apertures 119 are preferably tapered and contain split tapered dowels 121 which are forced into said tapered apertures to firmly clamp studs 117 by means of nuts 123. This construction is more fully illustrated in the copending H. W. Alden and L. Ray Buckendale application, Serial No. 711,601 filed February 16, 1934, now Patent No. 2,022,581, dated November 26, 1935.

Directly opposite cross shaft 69 a threaded inspection hole 125 is preferably provided in differential carrier 11 and a removable inspection hole cover 127 is provided therein.

It will be noted from the foregoing description and an inspection of the drawings, especially Figure 2 thereof, that the shaft 19 is below the plane of the axle shafts. It will be also noted that shaft 19 is offset laterally with respect to a point equidistant between the ends of the axle shafts and is substantially parallel to a horizontal plane. Bevel gears 39 and 55 have their axes in different planes and are what are generally termed "Hypoid" gears. This permits the axis of bevel gear 39 to be below and substantially parallel to the plane of the axes of spiral gears 76 and 91. This relationship is more clearly shown in Figure 2 wherein gears 76, 91, 55 and 39 and their axes X, Y, and Z are shown in broken lines. The use of "Hypoid" gears also permits the use of a ring gear 55 of relatively small diameter and a large pinion 39, as shown, and at the same time obtains a substantial speed reduction in the first reduction assembly. This lessens overhang and increases the strength of the whole device by balancing the load distribution.

In the usual conventional front mounted double reduction axle, the universal joint connecting the axle propeller shaft and the transmission propeller shaft is at a point slightly beyond the cover 49, here illustrated. The universal joint for the axle of my invention is adjacent the threaded portion 25 of shaft 19. It is thus seen that the axle of my invention has a distance from the axle centerline to the universal joint which is approximately one-third of that of a conventional front mounted double reduction axle, and is therefore particularly advantageous in an assembly where the insurance of a low universal operating angle is a problem. This will be evident from an inspection of Figure 1 wherein the distance from the universal joint element 27 to the axle 109 is approximately one-third as great as the distance from said axle to a point adjacent the end 35 of shaft 19, which point corresponds roughly to the location of the universal joint in a conventional front mounted double reduction axle.

Figure 3 illustrates schematically an axle of my invention as applied to a through drive, tandem axle unit A. The rear axle B of this unit is substantially identical with the axle of Figures 1 and 2. The forward axle C, however, requires that the end D be modified to permit the power to enter at this point. An embodiment of a preferred modified form is illustrated in Figure 4.

Splines 33a (Figure 4) of shaft 19a are extended beyond those shown in Figure 1 and are adapted to receive a universal joint coupling member 129. The cover 49 of Figure 1 is replaced with a closure member 131. Member 131 has an internal recess in which is inserted an oil seal 133 which cooperates with the hub of coupling member 129 to retain lubricant within the axle and exclude dirt and foreign matter. The end of the hub of coupling member 129 abuts the inner race of bearing 41 in the same manner as the flange of nut 43 in Figure 1. Coupling member 129 is removably secured to shaft 19a in abutting relationship with bearing 41 by means of a nut 135 threaded onto a threaded portion provided therefor on shaft 19a. Nut 135 is locked in position by means of a cotter 137.

By referring to Figure 3 it is readily seen that if a conventional axle is used in this tandem arrangement, only a very short inter-axle propeller shaft is possible. As it is necessary to provide for a considerable relative movement of the axles of a tandem unit, such a short length of propeller shaft would be decidedly impractical as universal joints will not operate satisfactorily at angles in excess of thirty degrees.

The above remarks are equally applicable to vehicles having extremely short wheel bases and to vehicles having their motors and transmissions mounted in their rear and in close proximity to their drive axles.

From the above description and discussion it is evident that the axle of my invention retains substantially all of the advantages of the above-noted Rockwell constructions, and in addition is adapted for application instances where it is impractical to employ the said Rockwell axle. Such instances, as noted above, may include short wheel base vehicles, through drive tandem units and vehicles having low and/or offset propeller shafts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A double reduction axle driving mechanism comprising a first reduction assembly and a second reduction assembly, said first reduction assembly comprising cooperating bevel gears of the "Hypoid" type, the axis of the second gear of said first reduction assembly lying in the same plane as the axes of the gears of said second reduction assembly, and the axis of the first gear of said first reduction assembly lying in a plane parallel to, but considerably below, said first named plane.

2. A double reduction axle driving mechanism comprising driving axles, a propeller shaft and double reduction gearing including a first reduction assembly and a second reduction assembly connecting said propeller shaft to said axles, said first reduction assembly comprising cooperating bevel gears of the "Hypoid" type with the axis of the first gear thereof in alignment with the axis of said propeller shaft and located in a horizontal plane substantially parallel to, but considerably below, a plane passing through the axes of said axles and the axes of the gears of said second reduction assembly, said propeller shaft terminating at a point immediately adjacent to a vertical plane passing through said axle, and means to drive said propeller shaft comprising a driving connection connected to said shaft.

3. A double reduction driving axle mechanism comprising an axle housing and a gear casing carried by said housing, a first reduction assembly and a second reduction assembly mounted in said casing, driving axles driven from said second reduction assembly, a propeller shaft cooperating with said first reduction assembly, said first reduction assembly comprising intermeshing bevel gears of the "Hypoid" type, one of said bevel gears being coaxially mounted on one end of said propeller shaft, the axes of said bevel gear and said shaft lying in a horizontal plane considerably below and substantially parallel to a plane passing through the axis of said axles, the axes of the gears of said second reduction and the axis of the other of said bevel gears, whereby said propeller shaft is offset vertically below said driving axles and horizontally from said second reduction assembly and said first named bevel gear is located inwardly towards said axles from the outer periphery of said other bevel gear.

4. A double reduction axle driving mechanism comprising a first reduction assembly and a second reduction assembly, said second reduction assembly including a bevel ring gear and a cooperating pinion, said ring gear and said pinion being of the "Hypoid" type whereby said pinion is located with its axis in a horizontal plane below and parallel to a plane passing through the axes of the gears of said second reduction assembly and the axis of the bevel ring gear, and said bevel ring gear is of relatively small diameter while still retaining a substantial speed reduction in said first reduction assembly.

5. A double reduction axle driving mechanism comprising a first reduction assembly and a second reduction assembly, drive axles driven by said second reduction assembly and a propeller shaft driving said first reduction assembly, said first reduction assembly including a bevel ring gear and a cooperating pinion, said propeller shaft being coaxially arranged with respect to said pinion, said ring gear and said pinion being of the "Hypoid" type whereby said ring gear is of relatively small diameter to reduce overhang and said pinion is relatively large to increase its strength, the axes of said propeller shaft and pinion being below said axles and lying in a plane parallel to a horizontal plane passing through said axles.

6. An automotive drive assembly for a tandem unit comprising spaced axles, a double reduction assembly associated with each of said axles, a propeller shaft in each of said reduction assemblies and reduction gearing connecting each of said propeller shafts to its corresponding axle, said reduction gearing being offset with respect to its respective axle on the side opposite to said other axle, said propeller shafts having ends terminating closely adjacent to the axles on the side opposite to said reduction gearing, a connecting shaft extending between said assemblies, universal joints joining said connecting shaft to the adjacent ends of said propeller shafts, and a driving connection associated with the opposite end of one of said propeller shafts.

7. In an automotive drive assembly, the combination set forth in claim 6, wherein said propeller shafts are located in horizontal planes spaced below and parallel to the plane of said axles.

HERBERT W. ALDEN.